United States Patent [19]

Wolf et al.

[11] 3,779,485

[45] Dec. 18, 1973

[54] MAGNETIC TAPE TRANSPORT SYSTEM AND ASSOCIATED CONTROLS

[75] Inventors: Edgar Wolf, New Hyde Park; Edward Lau, Old Westbury, both of N.Y.

[73] Assignee: Redactron Corporation, Hauppauge, N.Y.

[22] Filed: Aug. 17, 1971

[21] Appl. No.: 172,509

[52] U.S. Cl. .............................. 242/204, 242/67.4
[51] Int. Cl. ....................... B11b 15/32, G03b 1/04
[58] Field of Search ........................... 242/201–204, 242/67.4, 67.5, 188, 195; 274/4 D, 11 D

[56] References Cited

UNITED STATES PATENTS

| | | | |
|---|---|---|---|
| 3,093,334 | 6/1963 | Andrews | 242/201 |
| 3,103,318 | 9/1963 | Van Duyne | 242/188 |
| 2,971,716 | 2/1961 | Sampson | 242/188 |

*Primary Examiner*—Leonard D. Christian
*Attorney*—Alan K. Roberts et al.

[57] ABSTRACT

For the reversible driving of a magnetic tape casette, two spindles are selectively connected by electromagnetic clutches to a pulley system driven by a constant speed motor such that one spindle is driven while the other is free-wheeling. Inertia damping discs are mounted on the spindles to smooth the response of the free-wheeling spindle to the driven spindle to which the free-wheeling spindle is coupled via the magnetic tape. A braking system engages the discs in the absence of driving of either spindle. A burst of reverse torque is applied to the free-wheeling spindle before the tape is completely halted. A leader detection circuit is used to detect the tape ends whereupon rotary power to the driven spindle is reduced.

20 Claims, 8 Drawing Figures

INVENTORS
EDGAR WOLF
EDWARD LAU
BY
Roberts and Cohen
ATTORNEYS

INVENTOR.
EDGAR WOLF
EDWARD LAU
BY
Roberts and Cohen
ATTORNEYS

INVENTORS
EDGAR WOLF
EDWARD LAU
BY
Roberts and Cohen
ATTORNEYS

INVENTORS.
EDGAR WOLF
EDWARD LAU
BY
Roberts and Cohen
ATTORNEYS

INVENTORS.
EDGAR WOLF
EDWARD LAU
BY
Roberts and Cohen
ATTORNEYS

MAGNETIC TAPE TRANSPORT SYSTEM AND ASSOCIATED CONTROLS

FIELD OF INVENTION

This invention relates to magnetic tape transport systems and, more particularly, to casette driving mechanisms and associated electronic controls.

BACKGROUND

Existing casette transports fall into two general categories. First of all, there are capstan-pinchroller devices in which one or two capstan and pinchroller pairs cause tape motion and in which, in addition, reel tensioning devices such as motors or slip clutches are used for reel control. Secondly, there are reel-to-reel devices in which the tape is moved by applying torque to one reel or the other possibly with a speed control effected by a servo system which measures tape velocity (e.g., by reading a clock track on the tape or by using a tachometer of some sort coupled to the tape).

If, in the latter type of device, a reel is clutched to a shaft rotating at speed $\omega$, the resulting steady state speed of the tape at the transducer head will be $\omega r_1$ and thus varies with the radius. The tape velocity at the head will vary from $\omega r_{1min}$ to $\omega r_{1max}$. If the magnetic head is recording a pattern or data of constant frequency, the pattern recorded on the tape will vary in density from high at the beginning of the tape to low at the end of the tape with a density ratio of $r_{1max}/r_{1min}$. If the tape is rewound and played back in the original forward direction, the playback will be a time replica of the data originally recorded. Thus, it can be seen that for data recorded and read in the same direction, it suffices to use a constant angular speed drive and to clutch this in and out for start and stop rather than to servo the tape speed to a constant velocity. With such an arrangement, it is advantageously not necessary to touch the oxide side of the casette tape with a tachometer drive wheel or to have a permanent pre-recorded clock track on the tape.

While playback amplitude from the head varies proportionally with tape velocity, this is relatively easily accommodated by the read circuitry in which it is possible to rely on peak detection. The dynamic range of an amplifier upstream of the peak detector can be extended by the addition of a non-linear network which causes the amplification to be lower for larger signals.

One problem which occurs in a system wherein a tape drive is selectively clutched to one of two reels is that the undriven reel is in effect free-wheeling. However, this free-wheeling reel is actually coupled to the driven reel through the intermediary of the magnetic tape and it responds to the driven reel in a manner which causes the tape velocity profile to be somewhat under-damped. This is due, for example, to the fact that the tape is usually somewhat elastic as well as to the sudden application of torque which takes place when a reel or its spindle is suddenly clutched to a source of rotary power.

SUMMARY OF INVENTION

An object of the invention is to provide an improved magnetic tape drive or transport and more particularly an improved drive or transport for a tape casette.

Another object of the invention is to provide an improved tape transport system wherein servo controls are unnecessary and wherein rotary power is supplied by a constant speed motor.

In achieving these objectives, there is provided in accordance with the invention a source of rotary power which is arranged to drive two spindles in opposite rotary directions. These spindles are, for example, electromagnetically clutched to said source with one of the spindles being driven and the other being free-wheeling at any given time during operation.

In the above-outlined system, it is a feature of the invention to smooth out the velocity profile of the free-wheeling spindle or, in other words, its velocity response to the driven spindle by applying to the spindles inertia damping devices, the details of which will be described hereinafter.

Another feature of the invention is the provision of a brake or braking system, preferably effective through the inertia damping devices, to prevent drifting of the spindles and which also functions to bring the tape to a rapid halt.

Still another feature of the invention is the provision of a system capable of utilizing a momentary reverse torque to aid in bringing the tape to a halt, this feature preferably being brought about by the selective control and action of electromagnetic clutches or the like.

Yet another feature of the invention is to improve the technique of stopping and/or reversing a tape drive at leader by the incorporation into the system of means to reduce tape drive torque in anticipation of bringing the tape to a complete stop.

The above and further objects and features as well as advantages of the invention will become more apparent from the following description of a preferred embodiment as illustrated in the accompanying drawing.

DETAILED DESCRIPTION

Figure 1:
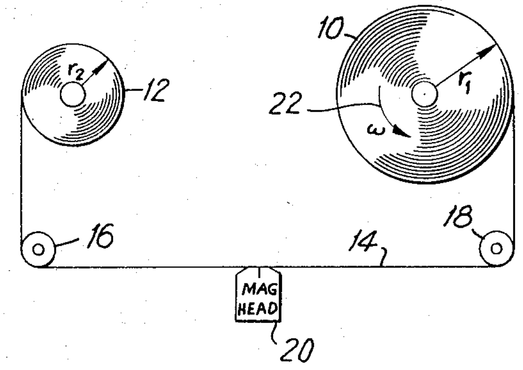
FIG. 1 is a view which diagrammatically illustrates a two-reel system for a magnetic tape wherein one reel is driven at a constant angular velocity.

In FIG. 1 is illustrated reels 10 and 12 on which is disposed a magnetic tape 14. The tape is being wound onto reel 10, which is therefore the take-up reel, from the reel 12, which is therefore the supply reel. Tape 14 is guided by guide rollers 16 and 18 adjacent to a transducer or magnetic head 20.

Reel 10 is driven at a constant angular velocity $\omega$ in the rotary direction shown by arrow 22. The radius $r_1$ is increasing due to the amount of tape being wound on the reel. At any given time the speed of the tape across head 20 is equal to $r_1\omega$.

Since the tape speed depends upon the effective radius of the take-up reel, it is clear that, when tape direction is reversed and the take-up and supply functions interchanged, a tape speed change generally takes place. It is possible that this speed change may lead to some difficulty as between the recording and reading of signals. However, this is easily overcome. One way of overcoming the aforesaid difficulty is run the tape in the same direction for both recording and reading. Another way relating particularly to binary data for computers is to practice the technique set forth in copending application Ser. No. 109,521, filed Jan. 25, 1971 by Edgar Wolf. It is thus possible to employ a constant angular speed drive in accordance with the invention.

Figure 2:
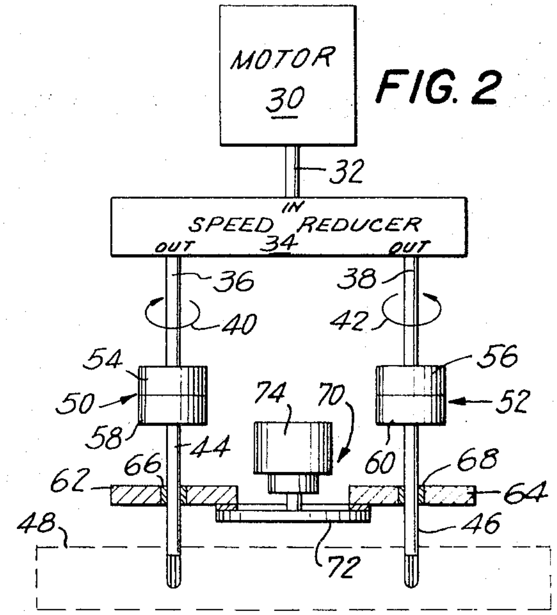
FIG. 2 is a view which diagrammatically illustrates a constant angular velocity system for driving tape reels selectively in one of two opposite rotary directions.

A diagrammatic illustration of a constant speed drive for casettes, in accordance with the invention, appears in FIG. 2. Therein is seen a constant speed motor 30 having an output shaft 32 which drives a speed reducer mechanism 34 having two output shafts 36 and 38 which are driven at typically equal angular velocities in opposite rotary directions as shown by arrows 40 and 42.

Spindles 44 and 46 which are selectively employed to drive reels within a casette 48 are respectively and selectively coupled to output shafts 36 and 38 by electromagnetic clutches 50 and 52.

Clutches 50 and 52 respectively include rotors 54 and 56 and armatures 58 and 60. An appropriately applied signal will lock one of the armatures to the corresponding rotor thereby coupling the associated shaft and spindle. In the apparatus of the invention, the other clutch will remain inactive and the spindle associated therewith will be essentially free-wheeling although it will in fact be coupled to the driven spindle through the intermediary of the tape and its reels.

Mounted on the spindles are discs 62 and 64. Friction rings 66 and 68 inserted between the discs and the spindles provide for a slip friction coupling therebetween. The discs 62 and 64 function as inertia damping devices to smooth the tape velocity as will be discussed hereinafter.

A braking device is indicated at 70. It includes a brake shoe 72 which engages the discs 62 and 64 to prevent the spindles from drifting when not being driven and to brake the spindles for aiding in bringing the tape to a halt when this is desired. The shoe 72 is operated by an electromechanical control 74.

Figure 3:
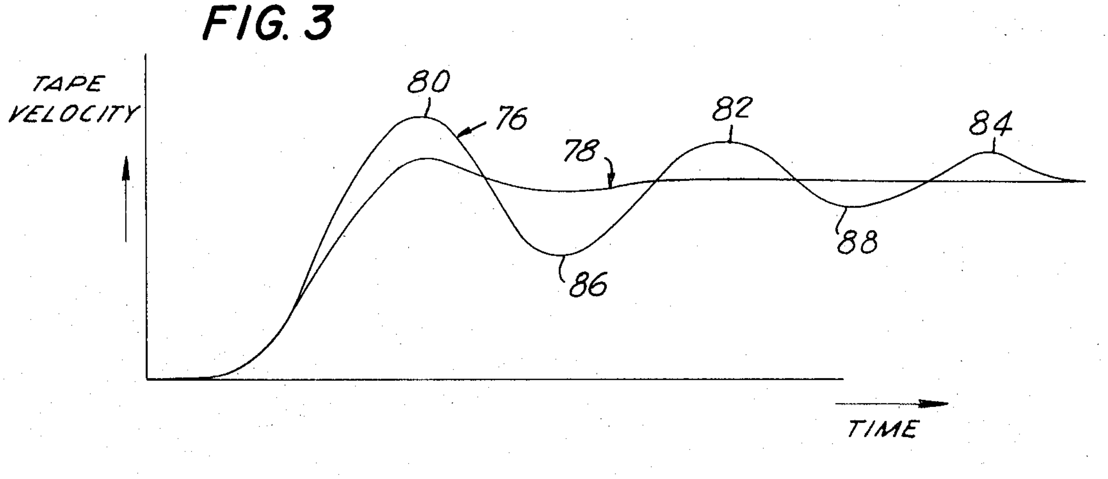
FIG. 3 is a chart illustrating the tape velocity in the system of FIG. 2 with and without inertia damping devices.

Hereinabove, reference was made to the utilization of discs 62 and 64. FIG. 3 is a chart of tape velocity versus time to aid in an understanding of the function of these discs. Curve 76 illustrates tape starting velocity without the inertia damping discs on the spindles. Curve 78 illustrates the tape starting velocity with the discs installed.

As can readily be seen from the chart, curve 76 has relatively high peaks (80, 82, 84) and low valleys (86, 88) whereas in contrast, curve 78 is relatively smooth. The high peaks and low valleys in curve 76 are a result of underdamping due to the fact that the driven reel must pull the tape and through it the free-wheeling reel, spindle and clutch output member, the tape being a somewhat elastic medium which responds to the sudden application of torque to a reel. It has been found that this undesirable curve form can be smoothed by the use of the inertia damping discs.

Figure 5:
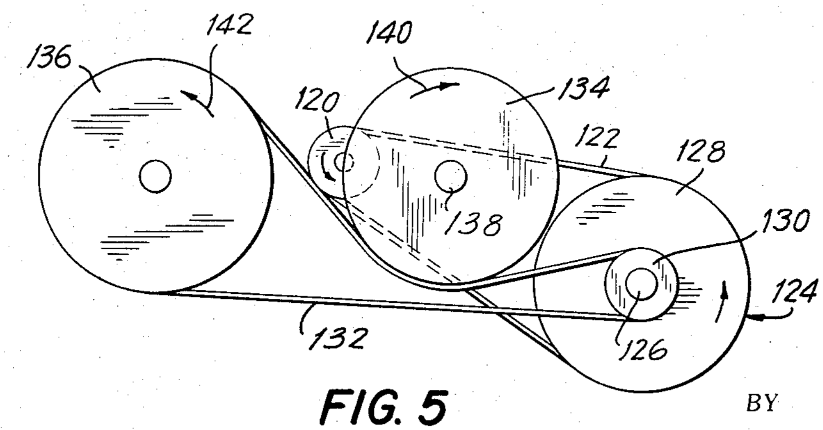
FIG. 5 is a diagrammatical front view of a part of the apparatus of FIG. 4.
Figure 4:
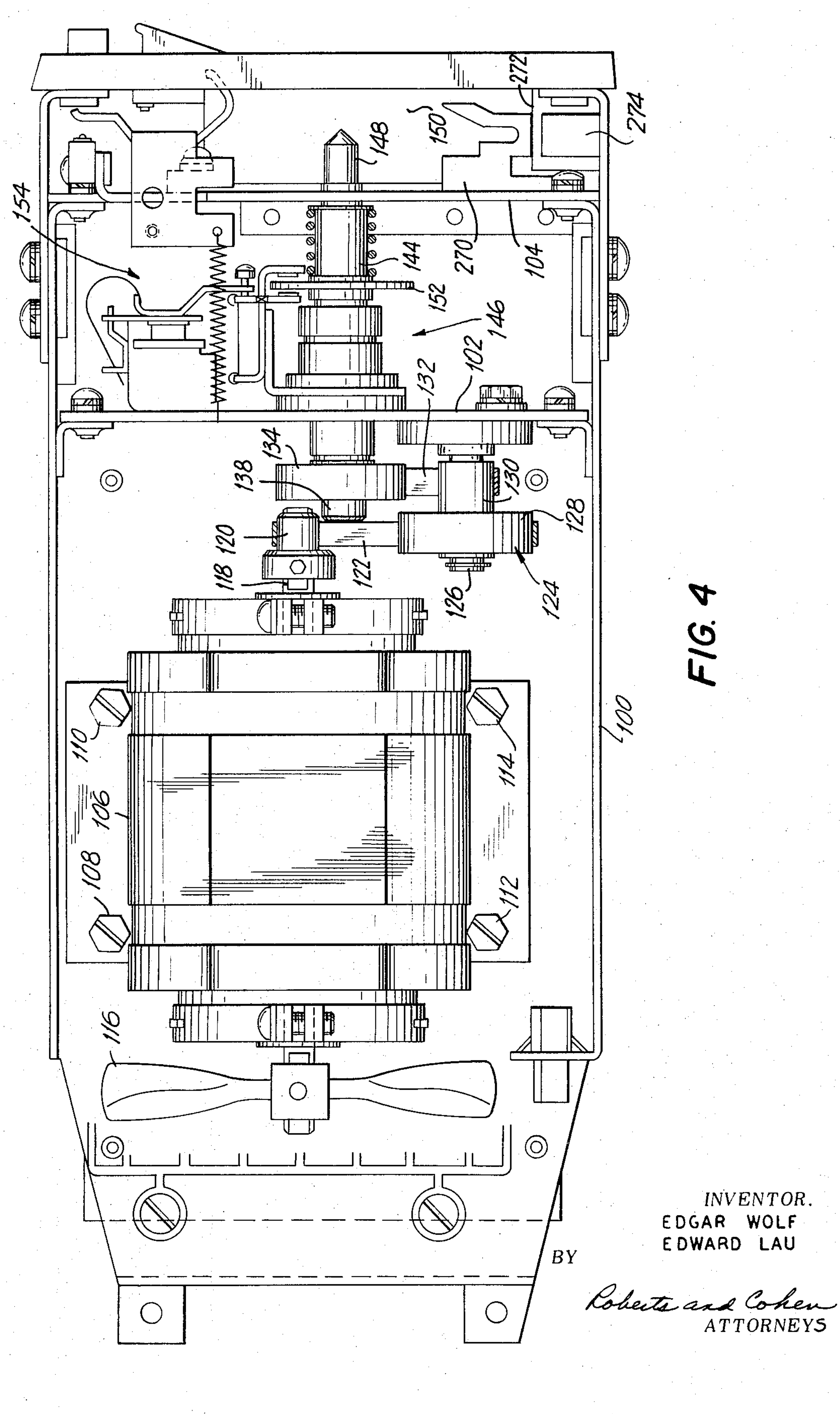
FIG. 4 is a plan view, partly cross-section, of the structure of a tape drive in accordance with the invention.
Figure 6:
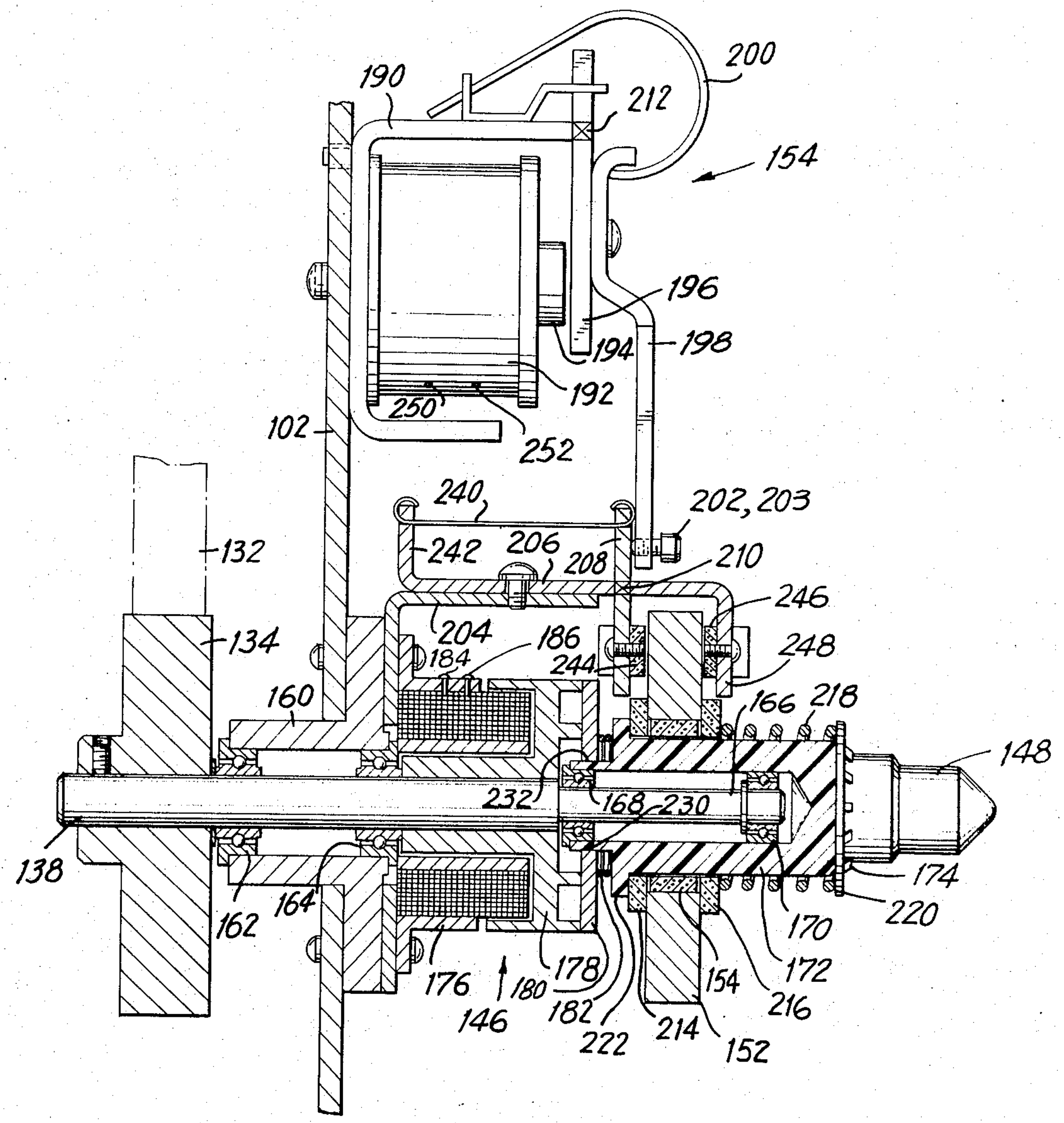
FIG. 6 is a view, on enlarged scale and partly in section, of a part of the apparatus of FIG. 4.

FIGS. 4–6 illustrate a specific construction of a drive for a casette in accordance with the invention. Therein appears a casing or housing 100 including partitions 102 and 104 and in which is supported a motor 106 connected to the casing by conventional means such as bolts 108, 110, 112 and 114.

The motor 106 is a conventional constant speed motor which may be either an alternating current motor or a direct current motor. It is conventionally provided with a blower 116 for purposes of cooling.

The motor 106 drives its output shaft 118 which is connected to a motor pulley 120 which operates through a belt 122 to drive an idler pulley 125 mounted on a shaft 126 supported on partition 102. The pulley 124 has a first section 128 of large diameter and integral therewith is a second section 130 of a smaller diameter. Sections 128 and 130 rotate with one another.

The section 130 through the intermediary of a belt 132 drives two pulleys 134 and a pulley directly behind the same and indicated at 136 in FIG. 5.

The pulleys 134 and 136 are respectively connected to shafts which are parallel and spaced from one another and the foremost of which is indicated at 138 in FIG. 4. These two shafts are supported for rotation by the partition 102.

As will be seen in FIG. 5, the belt 132 which is driven by the aforesaid section 130 of pulley 124 operates to rotate pulleys 134 and 136 in opposite rotary directions as indicated by arrows 140 and 142. For this reason the belt 132 passes from the section 130 of pulley 124 via a serpentine path between pulleys 134 and 136.

There are two spindles supported for rotation on the two shafts and these two spindles are in parallel with one another and one behind the other, the spindle 144 being seen in FIG. 4. Each spindle is adapted for being coupled for rotation to the associated shaft by means of electromagnetic clutches of which one is generally indicated at 146.

The ends of the spindles pass through the partition 104 terminating outwardly thereof at 148 by means of which they are available to engage the reels of a casette inserted into the space 150 in the aforesaid casing, an appropriate space being provided for the casette so that the spindle ends are appropriately accommodated centrally within the respective reels of the casette.

The spindles are provided with respective inertia damping discs 152 and these are in turn engaged by a braking mechanism 154, the function of which has been indicated hereinabove.

Reference is now made particularly to FIG. 6, wherein it can be seen that each shaft 138 is fixed to the associated pulley 134 which is rotated in one direction or the other by belt 132 according to which of the shafts is under consideration.

The discussion will be limited to one shaft and its associated components since this will be illustrative of the other shaft and its components which are substantially identical in nature.

More particularly, it will be seen that the partition 102 supports a bearing housing 160 within which are bearings 162 and 164 collectively and coaxially supporting the shaft 138. The frontmost end 166 of the shaft is of reduced diameter and has mounted thereupon the bearings 168 and 170. Spindle section 172 is mounted for rotation on bearings 168 and 170 and from bearing section 172 extends the bearing end 148, there being provided conventional vanes 174, the purpose of which is to engage in accommodating slots in the casette for purposes of driving the associated reel.

The electromagnetic clutch 146 includes a housing portion 176 in which is located the rotor 178 which is attached for rotation to and with the shaft 138. The armature associated with this rotor is indicated at 180. A spring 182, which is a relatively weak helical spring, is sandwiched between the armature 180 and the spindle section 172 for purposes of lightly applying the armature against the rotor 178 whereby to avoid inconsistencies which might arise should the armature 180 be able to assume some arbitrary position with respect to the rotor 178.

Electrical terminals 184 and 186 are mounted on clutch housing 176 for purposes of applying an electrical control signal to a winding therein for purposes of setting up an electromagnetic field which causes the armature 180 to be attracted to rotor 178. This signal is applied in a manner which will be indicated hereinafter.

The brake or braking device 154 referred to generally hereinabove includes a frame 190 attached to the partition 102 and supporting a coil member 192 effective through magnetizable member 194 to attract an armature 196 to which is affixed a lever 198. A spring 200 controls the rest position of the armature and thus of lever 198 at the extremity of which lever there are mounted equalizing screws 202, 203 (one behind the other).

A support member 204 is connected to the partition 102 and supports thereon a Z-shaped metallic member 206 on which rests a pivotal member 208 having its pivotal axis indicated at 210. The pivotal axis of armature 196 which is supported on the upper extremity of support member 190 is indicated at 212.

The inertia disc 152 has centrally located therein a friction insert or ring 154 by means of which engagement is made with the spindle section 172 which may be of plastic or metal or the like. The disc 152 is sandwiched between two friction washers 214 and 216, the total sandwich being urged together by means of a helical spring 218 which acts against a flange 220 which is a part of the spindle. The sandwich is urged against a further flange 222 which is also a part of the spindle and the degree of intensity with which the friction washers 214 and 216 are urged against the disc 152 and against the flange 222 determine the degree of coupling between the disc and the spindle.

The spindle end 230 has a square cross-section and is accommodated in a square hole 232 provided in the armature 180 of the electromagnetic clutch. As a consequence of this, the spindle turns with the armature 180 and is thus driven by the rotor 178 and the shaft 138 when the armature 180 is locked to the rotor 178.

A wire 240 is mounted between the section 242 of member 206 and the upper extremity of pivotal member 208. This wire functions to retain the member 208 in a given position of rest. At the bottom of the pivotal member 208 is a brake shoe 244, a corresponding but stationary brake shoe being mounted on the other side of disc 152 and being indicated at 246, the shoe 246 being mounted specifically on the section 248 of member 206.

Terminals 250 and 252 are shown on the winding section 192 of the braking unit. Through these terminals are applied a signal intended to actuate and deactivate the brake shoe 244. Forcing brake shoe 244 against disc 152 causes braking action between the brake shoe 244 and disc 152 and also brake shoe 246 and disc 152 as the disc is trapped between the brake shoes.

In operation, movement of the belt 132 will drive the pulley 134 and thereby rotate the shaft 138 in bearings 162 and 164. If the electromagnetic clutch 146 has not been actuated, the armature 180 thereof will bear only lightly against the rotor 178 and will not be caused to rotate with the said rotor.

Under these circumstances usually a signal will be applied to the terminals 250 and 252 to operate the armature 196 in such a fashion that the brake shoes 244 and 246 are applied to opposite faces of disc 152 whereupon the disc 152 is held against rotation. Since the spring 218 is pushing the friction washer 216 against the disc 152 and the latter against friction washer 214 and all of these elements against the flange 222, the braking of disc 152 will operate on the spindle to hold the same against rotation. If, however, the brake is not applied, the spindle will merely be free-wheeling and will not rotate with the shaft 138 since the spring 182 is insufficient in and of itself to cause a locking of armature 180 against the rotor 178.

However, when an appropriate signal is applied to terminals 184 and 186 the armature 180 will be strongly attracted to the rotor 178 and will be effectively locked thereto. The armature 180 will therefore rotate with the rotor 178 as well as the shaft 138 and because of the engagement of spindle end 230 in the square hole 232 the spindle will be caused to rotate with the shaft 138 on which it is supported for rotation by bearings 168 and 170.

After continued use of the above described device and application of brake shoes 244 and 246 against the opposite faces of disc 152, it is possible that brake shoes 244 and 246 may be subject to wear. To account for this wear, as well as to provide for adjustment of position of the members 208, the screw 202 can be employed for adjustment purposes and particularly to equalize the application of the brake shoes against the two respective discs on the two respective shafts mentioned hereinabove.

From what has been described above, it will now appear that the structure of this invention provides for two spindles 144 which are mounted on shafts 138 to which they are respectively coupled for rotation by the operation of electromagnetic clutches 146. Associate circuitry is provided so that only one of the electromagnetic clutches is operative at a time so that in effect one of the spindles will be driven by its shaft 138, whereas the other will be free-wheeling with respect to its associated shaft. Since the shafts are rotated in opposite directions as described hereinbefore, the spindles are adapted for the driving of the two reels of a casette mounted as mentioned hereinabove. It will also appear that a braking force can be applied to the inertia damping discs by the appropriate application of signals at terminals 250 and 252.

Referring again to FIG. 4, and more particularly to the space 150 lying outside of the partition 104, there are further indicated casette holder arms 270 which function to hold a casette in position in the space 152. Moreover, there is illustrated a magnetic head 272, the purpose of which is to read and write with respect to the magnetic tape of a casette loaded in said space 150. Still further, there is indicated at 274 a photoelectric cell for indicating when either end of the magnetic tape has been reached, as will be discussed in greater detail hereinafter.

Figure 7:
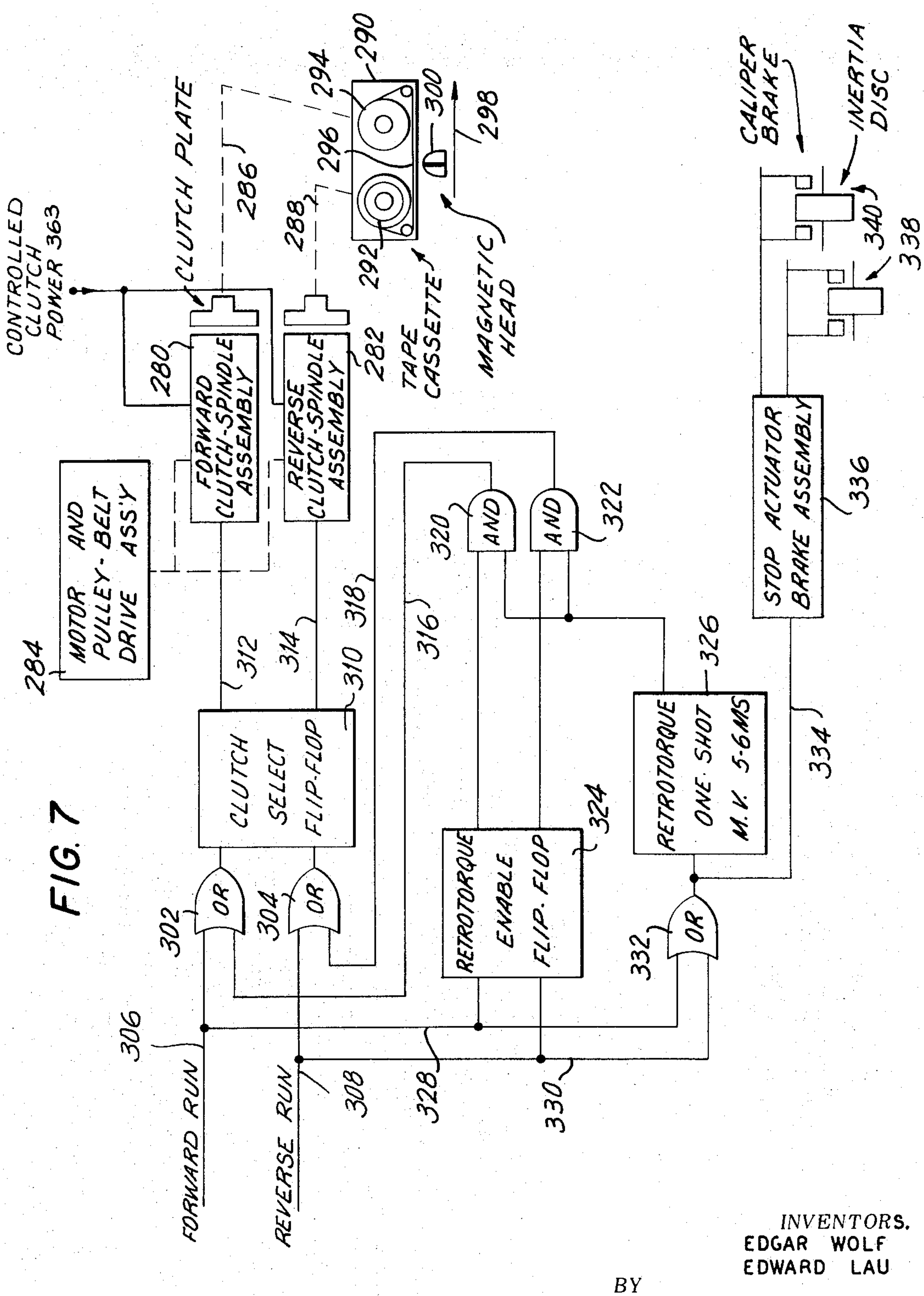
FIG. 7 is a partly logical, partly diagrammatic illustration of a circuit employed with the apparatus of FIGS. 4–6.

FIG. 7 illustrates a logic diagram of a circuit employed with the apparatus of FIGS. 4–6 as well as some of the elements thereof.

More particularly, there is indicated a forward clutch spindle assembly 280 and a reverse clutch spindle assembly 282, the details of which have been noted hereinabove, these being operative to couple a motor and pulley-belt drive assembly 284 to the spindles which are used for driving the casette and which are generally indicated at 286 and 288. The casette itself is indicated at 290 along with its reels 292 and 294. The magnetic tape is indicated at 296, its direction of forward motion being indicated by arrow 298, the magnetic head for transducing signals with respect to the tape being indicated at 300.

The circuit comprises two OR-gates 302 and 304, these receiving respectively input signals via lines 306 and 308. These signals are the forward run and the reverse run signals. The outputs of the OR-gates 302 and 304 are coupled to a clutch select flip flop 310 whose outputs are coupled via lines 312 and 314 to the assemblies 280 and 282 and determine which of the electromagnetic clutches is to be activated and which of the clutches is not to be activated.

Other inputs to OR-gates 302 and 304 are received via lines 316 and 318 respectively, these being the outputs of AND-gates 320 and 322. Inputs to these AND-gates are received from retrotorque enable flip flop 324 as well as from retrotorque one-shot multivibrator 326.

Inputs to the flip flop 324 are received from lines 306 and 308 via lines 328 and 330 respectively. The flip flop 324 is thus enabled to remember when a signal has been received which actuates one of the electromagnetic clutches. These signals on lines 328 or 330 pass through the OR-gate 332 to the one-shot multivibrator 326 and pass as well via line 334 to the stop actuator brake assembly 336. These in turn operate the caliper brakes generally indicated at 338 and 340 and which as described above are effective to engage the respective inertia damping discs.

When either the forward or reverse clutch assembly 280 or 282 is energized by operation of flip flop 310 due to signals received via lines 306 or 308, the respective spindle is mechanically coupled to the motor drive. The energized clutch spindle assembly in turn drives the related casette tape reel thereby moving the magnetic tape in either a forward or a reverse direction.

The clutch select flip flop 310 selects either the forward or reverse run electromagnetic coil. When the coil is energized it mechanically engages the tape casette spindle drive to the motor drive assembly. If the forward clutch spindle drive is engaged, the reverse tape spindle drive is free-wheeling. If the reverse clutch spindle drive is engaged, the forward tape spindle drive is free-wheeling.

When the tape drive system is driving the tape casette reel in either the forward or reverse direction, the retrotorque clutch circuit, upon sensing a stop condition (absence of either run signal), will apply a momentary signal to the clutch select flip flop. This allows the opposite clutch spindle assembly (i.e., the free-wheeling spindle) to energize. This results in the tape casette reels being momentarily driven in the opposite direction. This momentary driving of the tape reel in the opposite direction in conjunction with the stop actuator brake makes it possible for the tape casette reels to come to a smooth stop. At the same time it insures that there will not be any spilling over or breakage of the magnetic tape.

The retrotorque enable flip flop 324 memorizes whether the forward or reverse run command is present. It selects the proper gate 320 or 322 which will allow the momentary retrotorque pulse signal that is generated by the retrotorque one-shot multivibrator 326 to energize the free-wheeling clutch spindle assembly. This one-shot signal may be, for example, of about 5 to 6 milliseconds although other time durations are clearly possible.

It should be noted that the tretrotorque pulse is always applied to the clutch spindle assembly that has been free-wheeling. Moreover, the retrotorque one-shot pulse is always generated in conjunction with the stop actuator brake except upon initial power turn on of the tape casette drive assembly.

The stop actuator brake assembly applies the caliper-type brakes to each of the inertia damping discs which are located on the forward and reverse clutch spindle assemblies. The stop actuator brakes are applied in the absence of either run signal as long as power is applied to the unit.

Figure 8:
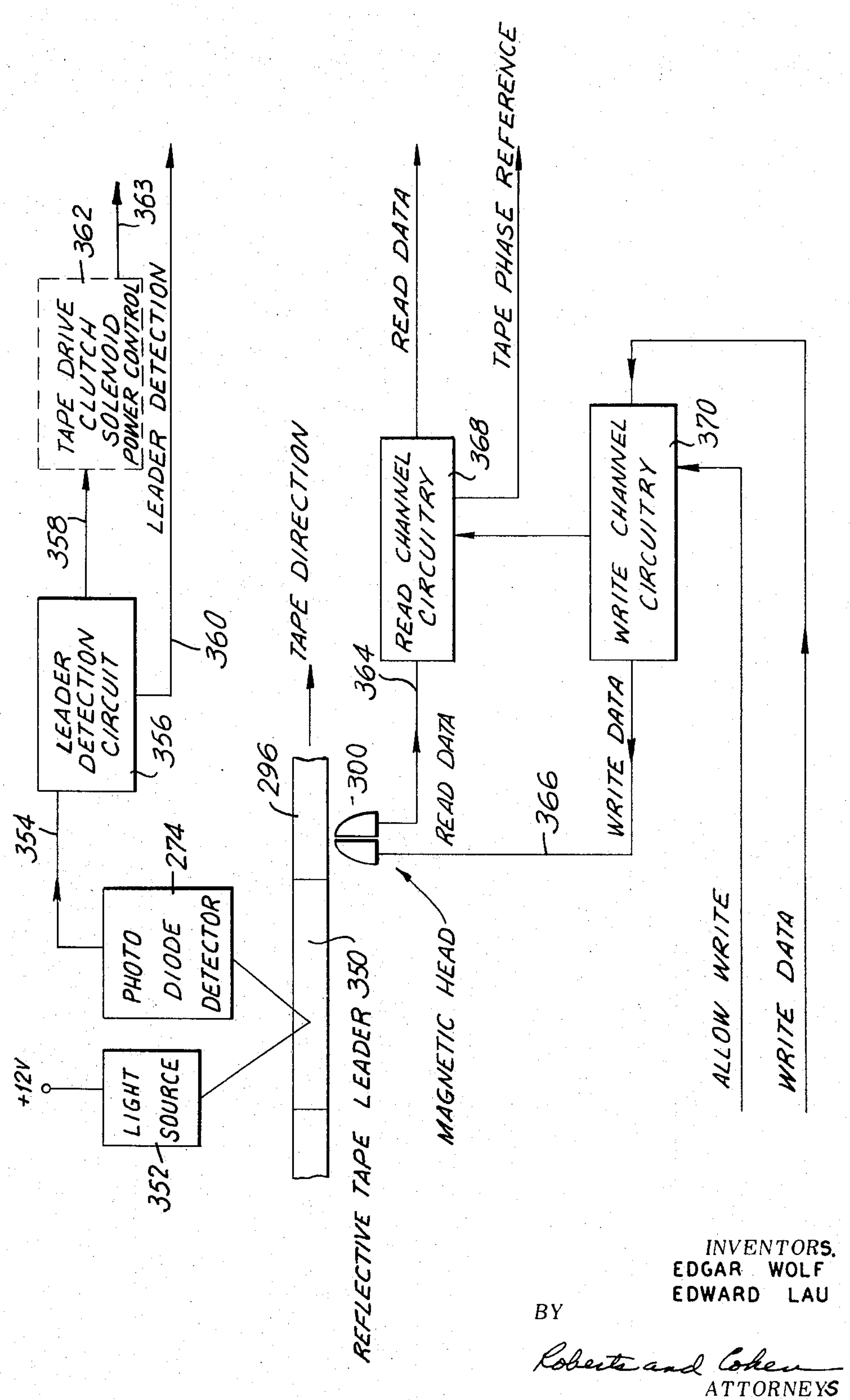
FIG. 8 is a block diagram which illustrates a further feature of the invention.

FIG. 8 illustrates further features of the invention and particularly that the tape 296 is provided with a light reflective leader 350 at opposite ends of the tape. This enables light generated in a light source 352 to be picked up by the photodiode detector 274 (see also FIG. 4), the signal thereby generated being transmitted via line 354 to a leader detection circuit 356 from whence signals are passed via lines 358 and 360. The signal which goes to line 358 is transmitted to the tape drive clutch solenoid power control indicated generally at 362, whereas the signal transmitted via line 360 is passed on to an associated computer circuit or the like wherein are generated commands for a full stop or the like.

The detection of leader (or trailer) as reported on line 358 causes the amount of power transmitted by the tape drive clutch solenoid power control 362 to the clutches 280, 282 via 363 to be diminished from full power to reduced power in order to reduce the torque transmission capability of said clutches. This is to protect the attachment of the tape and leader to the hubs in the casette from severe shock.

The magnetic head 300 transmits data which is read via line 364 and receives write signals via line 366. General read channel circuitry is provided as indicated at 368 and conventional write channel circuitry may be provided as indicated at 370. These circuits, however, may be the special circuits employing the special techniques as, for example, disclosed in copending application Ser. No. 109,521, filed Jan. 25, 1971, in the name of Edgar Wolf.

From what has been stated hereinabove, and the aforegoing descriptions of the various mechanical structures and electronic circuits, it will now appear that there has been generally disclosed a magnetic tape transport apparatus for a device which includes a tape source reel, a tape take-up reel and a tape which is connected between said source reel and take-up reel and which is adapted for being stripped from the source reel and wound upon the take-up reel. This apparatus comprises in accordance with the invention a source of rotary power as well as a device for selectively coupling this source of rotary power to the take-up reel so that the tape is wound on the latter and stripped from the tape source reel. Furthermore, there is provided inertia damping devices operatively associated with the source reel to smooth the velocity response of the latter to the application of rotary power to the take-up reel.

As stated hereinabove, a feature of the invention is a braking device to hold the reels against rotation when there is no rotary power applied to the take-up reel. Another feature is the provision of detectable means on the ends of the tape coupled to the respective reels with a photoelectric detection device being provided to detect the same and to decrease the amount of rotary power supplied to the take-up reel.

It has also been shown that a feature of the invention is to provide a command device to control the supply and cut off of rotary power to the take-up reel and apparatus to supply a temporary reverse torque to the supply reel when power to the take-up reel is cut off.

As described above, it is seen that the inertia damping discs encircle respective of the spindles, there being auxiliary devices frictionally coupling the discs to the spindles to permit relative rotation between the spindles and discs upon acceleration of the spindles. In this respect it will be noted that it is the inertia damping disc associated with the free-wheeling spindle which is important at any given time since it is actually the control of the free-wheeling disc and the resultant speed of the tape which is desirably controlled.

For illustrative purposes only, a set of typical parameters are listed below:

| | |
|---|---|
| Tape Base Material: | Polyester |
| Tape Width: | 0.150 inch |
| Tape Thickness: | 0.0005 inch base + 0.0002 magnetic coating |
| Maximum Reel Diameter: | 2.0 inch |
| Minimum Reel Diameter: | 1.2 inch |
| Tape Lengths (approximately): | 200 ft. |
| Moment of Inertia of Inertia Damping Disc | $3\times10^{-4}$ in. oz. sec.$^2$ |
| Friction Torque of Inertia Damping Disc to Spindle | 1.2 oz. in. |
| Angular Speed of Motor | 3600 RPM |
| Angular Speed of Speed Reduced Clutch Inputs | 360 RPM |
| Maximum Torque Rating of Clutches | 32 oz. in. |
| Friction Torque of Brake to Inertia Disc (when engaged) | 5 oz. in. |
| Friction Torque Transmitted by Unenergized Clutch Due to Pre-Load and Residual Magnetism | 0.25 oz. in. |

The above values are illustrative only, and are not intended to limit the invention.

There will now be obvious to those skilled in the art many modifications and variations of the structures and circuits set forth hereinabove. These modifications and variations will not depart from the scope of the invention if defined by the following claims.

What is claimed is:

1. A magnetic tape transport apparatus for a device which includes a tape source reel, a tape take-up reel and a tape which is connected between said source reel and take-up reel and which is adapted for being stripped from the source reel and wound upon the take-up reel, said apparatus comprising: a source of rotary power, spindles for supporting said reels, coupling means for selectively coupling said source of rotary power to the spindle supporting said take-up reel so that said tape is wound on the latter and stripped from the tape source reel, and inertia damping means separate from said coupling means operatively associated with said source reel to smooth the velocity response of the latter to the application of rotary power to the take-up reel, said damping means being coupled by said spindles to said source of rotary power.

2. Apparatus as claimed in claim 1 comprising brake means to hold the reels against rotation when there is no rotary power applied to the take-up reel.

3. Apparatus as claimed in claim 2 comprising detectable means on the ends of the tape coupled to the source reel and detection means to detect said detectable means and to decrease the amount of rotary power supplied to the take-up reel.

4. Apparatus as claimed in claim 2 comprising command means to control the supply and cut-off of rotary power to said take-up reel and means to supply a temporary reverse torque to the source reel when power to the take-up reel is cut off.

5. Apparatus as claimed in claim 1, wherein said inertia damping means includes a disc and a slip friction coupling between said disc and source reel.

6. A drive for a casette which includes two reels and a magnetic tape coupled between the reels, said reels being capable of interchangeably functioning as take-up and supply reels; said device comprising spindles on which said reels are adapted for being mounted, drive means for selectively driving the spindles in opposite rotary directions so that, when one spindle is driven, the other spindle idles, the idling spindle being rotated by the driven spindle to which it is coupled by said reels and tape, and inertia damping means operatively associated with said spindles and effective to smooth the velocity response of the idling spindle upon actuation of the driven spindle, said damping means being coupled by said spindles to said drive means.

7. A drive as claimed in claim 6, wherein said inertia damping means includes discs encircling respective of said spindles and auxiliary means frictionally coupling the discs to the spindles to permit relative rotation between the spindles and discs upon acceleration of the spindles.

8. A drive as claimed in claim 7 comprising brake means for engaging and holding the discs against rotation.

9. A device as claimed in claim 8, wherein said drive means includes an electric motor, shafts driven in opposite rotary directions by said motor, and electromagnetic clutches selectively coupling respective of the shafts to said spindles.

10. A device as claimed in claim 8, wherein said auxiliary means comprises friction washers sandwiching the respective discs, and spring means urging the washers against the discs.

11. A device as claimed in claim 8, wherein the brake means includes caliper brakes engaging the discs.

12. A device as claimed in claim 9, wherein said drive means further includes a motor pulley driven by said motor, an idler pulley, a belt coupling said pulleys, further pulleys on said shafts, and a further belt passing in serpentine fashion between said further pulleys to drive the latter in opposite rotary directions.

13. A device as claimed in claim 12, wherein said spindles are mounted in idling relation on said shafts, said clutches including sections respectively coupled in rotative sense to said shafts and spindles.

14. A device as claimed in claim 13 comprising spring means urging said clutch sections together.

15. A device as claimed in claim 13 comprising friction rings supporting said discs on said spindles.

16. A device as claimed in claim 9 comprising means for selectively actuating said clutches and means for releasing said brake means when either of said clutches are actuated.

17. A device as claimed in claim 16 comprising means for actuating the brake means except when one of the clutches is actuated.

18. A device as claimed in claim 17 comprising means for temporarily and momentarily actuating the clutch associated with the idling spindle even though the brake means is actuated.

19. A device as claimed in claim 18 comprising means to reduce the power of said drive means.

20. A device as claimed in claim 9, wherein the tape includes leaders coupled to said reels, comprising photoelectric means to detect said leaders and to control said brake means and clutches.

* * * * *